United States Patent Office 3,444,251
Patented May 13, 1969

3,444,251
PRODUCTION OF GEM-DIFLUOROALKENES
Lloyd E. Gardner, Bartlesville, Okla., assignor to Phillips Petroleum Company, a corporation of Delaware
No Drawing. Filed Dec. 23, 1965, Ser. No. 516,129
Int. Cl. C07c 17/34, 17/24
U.S. Cl. 260—653.5                    9 Claims

ABSTRACT OF THE DISCLOSURE

Gem-difluoroalkenes are produced by dehydrohalogenating 1,1,1-difluorohaloalkanes in the presence of low surface area alumina. Improved results are obtained by the use of low surface area alumina containing at least one metal promoter.

This invention relates to the production of gem-difluoroalkenes. In one aspect, it relates to the production of 1,1-difluoroalkenes by the dehydrohalgenation of 1,1-difluoro-1-haloalkanes over a low surface area alumina catalyst. In another aspect, it relates to the production of 1,1-difluoroalkenes by the catalytic dehydrohalogenation of 1,1-difluoro-1-haloalkanes by contacting them with a low surface area alumina catalyst. In another aspect, it relates to the production of gem-difluoroalkenes by contacting 1,1-difluoro-1-haloalkanes with low surface area alumina catalyst in the presence of metal or metal compound promoters. In another aspect, it relates to the dehydrohalogenation of 1,1-difluoro-1-haloalkanes over a low surface alumina catalyst to produce a 1,1-difluoroalkene with a minimum of side reactions. In still another aspect, it relates to the production of 1,1-difluoroethylene by the dehydrochlorination of 1,1-difluoro-1-chloroethane, substantially free of side reactions, by contacting the starting material with a low surface area alumina.

The dehydrochlorination of 1,1-difluoro-1-chloroethane and similar compounds over alumina containing catalysts is well known in the art. Various other catalysts, including aluminum fluoride, charcoal and various metal compounds have also been used in such a dehydrohalogenation reaction. However, a number of side reactions also occur under the dehydrohalogenation conditions, and the product of the reaction is a mixture of fluoro- and chloro-containing compounds both saturated and unsaturated. The major product of such a reaction is generally an unsaturated fluoro-chloride. Gem-difluoro compounds are usually produced in such reactions, but they are usually produced in low yield, and must then be separated from the various other chloro and fluoro compounds which are also formed.

It is therefore an object of this invention to provide a method for producing a gem-difluoro compound substantially free of other fluorinated and chlorinated products. It is another object of this invention to dehydrohalogenate a 1,1-difluoro-1-haloalkane to produce a gem-difluoroalkene. It is still another object of this invention to produce a relatively pure gem-difluoroalkene by dehydrohalogenating a 1,1-difluoro-1-haloalkane. It is yet another object of this invention to produce 1,1-difluoroethylene from 1,1-difluoro-1-chloroethane with a minimum of side reactions.

According to the invention, a gem-difluoroalkene is produced by contacting a 1,1-difluoro-1-haloalkane with low surface area alumina under dehydrohalogenation conditions.

The use of a relatively low surface area alumina is essential to the operation of my invention. Preferably, the alumina is alpha-alumina. However, any alumina having a surface area below about 50 square meters per gram can be used. For example, eta- or gamma-alumina which has been heated sufficiently to reduce the surface area below about 50 square meters per gram can be used. Use of an alumina having a higher surface area than 50 square meters per gram will encourage side reactions and result in a product mixture difficult to separate in order to obtain pure gem-difluoroalkenes.

The starting materials useful in the process of my invention have the general formula $R_2CHCF_2X$, where R is hydrogen or an alkyl radical preferably having 1 to 8 carbon atoms, the total number of carbon atoms in the molecule preferably does not exceed 10, and X is chlorine or bromine.

Some examples of compounds which are useful in the process of my invention are:

1,1-difluoro-1-chloroethane
1,1-difluoro-1-bromoethane
1,1-difluoro-1-chloropropane
1,1-difluoro-1-bromobutane
1,1-difluoro-1-chlorohexane
1,1-difluoro-1-bromooctane
1,1-difluoro-1-chlorodecane
1,1-difluoro-1-chloro-2-methylpropane
1,1-difluoro-1-bromo-3-methylbutane
1,1-difluoro-1-chloro-4-ethylhexane
1,1-difluoro-1-bromo-2-ethylbutane
1,1-difluoro-1-chloro-3,3-dimethylbutane Preferably, the alumina of low surface area contains a metal promoter which facilitates the conversion of the 1,1-difluoro-1-haloalkane to the 1,1-difluoroalkene. Examples of applicable metal promoters are zinc, chromium, cobalt, silver, copper, vanadium, iron, molybdenum, nickel, lead, antimony, tin, ruthenium rhodium, palladium, osmium iridium, and platinum. The metal promoter can be used either as the free metal or as a compound thereof. If desired, two or more metal promoters can be used. The metal promoter can be incorporated in the alumina by well-known methods such as grinding a salt, oxide, or other form of the metal with the alumina. A preferred method of preparing the catalyst involves impregnation of the alumina with a solution containing the metal compound. Metal compounds which are usable include the oxides, fluorides, chlorides, bromides, iodides, nitrates, and fluoroborates of zinc, chromium, cobalt, silver, copper, vanadium, iron, molybdenum, nickel, lead, antimony, tin, ruthenium, rhodium, palladium, osmium, iridium, and platinum.

When the alumina of low surface area contains a metal promoter, the concentration of the metal promoter, expressed as the concentration of the free metal, generally is not greater than about 50 weight percent of the catalyst composite, usually being not greater than about 30 weight percent of the catalyst composite. When ruthenium, rhodium, palladium, osmium, iridium, or platinum is used as the metal promoter, the concentration of metal promoter, expressed as the concentration of the free metal, is usually not greater than about 1 weight percent.

Although the reaction temperature employed in the process of this invention can vary over a broad range, it will generally be within the range of about 300–1200° F., usually being within the range of about 600–1000° F. The flow rate of the 1,1-difluoro-1-haloalkane, expressed as the flow rate of the 1,1-difluoro-1-haloalkane in the gaseous state, will generally be within the range of about 20–2000 volumes (standard conditions) per volume of catalyst per hour, usually being within the range of about 50–500 volumes (standard conditions) per volume of catalyst per hour. If desired, an additional amount of an inert diluent or carrier such as nitrogen, helium, argon, or the like can be present with the 1,1-difluoro-1-haloalkane. Although the total pressure is conveniently maintained at substantially atmospheric, pressures somewhat above or below atmospheric can be employed. Usually the total pressure will be within the range of about 0.1–20 atmospheres, preferably being within the range of about 1–5 atmospheres.

The 1,1-difluoroalkene is readily separated from other components of the effluent from the process of this invention by conventional techniques such as distillation, chromatography, and the like, preferably after removal of hydrogen halides, e.g., with water or an aqueous solution of caustic.

Examples of some 1,1-difluoroalkenes which can be produced by the process of this invention include:

1,1-difluoroethylene
1,1-difluoropropene
1,1-difluoro-1-butene
1,1-difluoro-1-hexene
1,1-difluoro-1-octene
1,1-difluoro-1-decene
1,1-difluoro-2-methylpropene
1,1-difluoro-3-methyl-1-butene
1,1-difluoro-4-ethyl-1-hexene
1,1-difluoro-2-ethyl-1-butene
1,1-difluoro-3,3-dimethyl-1-butene Example I A gaseous stream of 1,1-difluoro-1-chloroethane was passed at atmospheric pressure through a 1-in. x 12-in. tubular reactor packed with 100 ml. of various catalysts. The flow rate of the 1,1-difluoro-1-chloroethane was maintained at 60–100 volumes per volume of catalyst per hour. The catalyst temperature was maintained at 700° F. The reactor effluent was passed through water to remove hydrogen halides, and the hydrogen halide-free product was dried and analyzed gas chromatographically, identification of the components being obtained with the aid of mass spectrometry. The results of these runs are summarized in Table I, the mole percent of each component in the effluent being rounded off to the nearest whole number except in those instances in which the mole percent was less than 1.

TABLE I

| Catalyst | Composition of dried, hydrogen halide-free effluent, mole, percent | | | | |
|---|---|---|---|---|---|
|  | $CH_3CF_2Cl$ | $CH_2=CF_2$ | $CH_3CF_3$ | $CH_2=CFCl$ | $CH_2=CCl_2$ |
| Gamma-alumina [1] | 0.5 | 5 | 9 | 85 | 0 |
| Gamma-alumina [2] | 0.2 | 11 | 22 | 30 | 32 |
| Aluminum fluoride | 10 | 4 | 43 | 22 | 22 |
| Fluorided gamma-alumina [3] | 0.6 | 0.2 | 48 | 2 | 49 |
| Alpha-alumina [4] | 94 | 3 | 0.8 | 2 | 0 |

[1] Fresh catalyst. Surface area approximately 200 square meters per gram.
[2] After 10 hours on stream. Additionally, the dried, hydrogen halide-free effluent formed with this catalyst contained 5 mole percent of unidentified material.
[3] Prepared by passing a dry stream of hydrogen fluoride containing 50 volume percent nitrogen over dried gamma alumina for 4 hours, during which time the temperature of the catalytic material rose from an initial value of about 300° F. to a maximum value of 650° F.; the flow rate of the hydrogen fluoride-nitrogen mixture was 200 volumes per volume of catalyst per hour. The resulting fluorided alumina catalyst contained 51.6 weight percent fluorine and had a surface area of 25 square meters per gram.
[4] Surface area less than 1 square meter per gram.

Thus, the use of alpha-alumina in the catalytic conversion of 1,1-difluoro-1-chloroethane resulted in the formation of 1,1-difluoroethylene as the principal reaction product, other substances being formed in lesser amounts. In contrast, the other aluminum-containing catalysts caused the 1,1-difluoro-1-chloroethane to be converted primarily to products other than 1,1-difluoroethylene, the latter compound being produced only in minor amounts. It is to be noted that unreacted 1,1-difluoro-1-chloroethane will be recycled to the catalyst, and thus will eventually be completely reacted. Thus, although the yield of 1,1-difluoroethylene is low per pass through the catalyst, the ultimate yield will be quite high, and the product formed will have a much higher concentration of 1,1-difluoroethylene than the product formed with any other catalyst in this example.

Example II

A gaseous stream of 1,1-difluoro-1-chloroethane was passed at atmospheric pressure through a 1-in. x 12-in. tubular reactor packed with 100 ml. of a catalyst comprising alpha-alumina promoted with nickel or zinc or a catalyst comprising cobalt- and molybdenum-promoted alumina of low surface area. The nickel- or zinc-promoted catalysts were prepared by impregnation of alpha-alumina with an aqueous solution of a nickel or zinc salt, followed by draining of the excess solution from the catalyst, drying of the catalyst, and heating of the catalyst at 950–1000° F. overnight in a stream of nitrogen. The cobalt- and molybdenum-promoted alumina (Girdler T–305; Girdler Catalyst Division, Chemetron Corp.) had a surface area of 26 square meters per gram. The flow rate of the 1,1-difluoro-1-chloroethane was maintained at 60–100 volumes per volume of catalyst per hour. The catalyst temperature was maintained at 700° F. The reactor effluent was passed through water to remove hydrogen halides, and the hydrogen halide-free product was dried and analyzed gas chromatographically, identification of the components being obtained with the aid of mass spectrometry. The results of these runs are summarized in Table II, the mole percent of each component in the effluent being rounded off to the nearest whole number.

TABLE II

| Metal promoter on alumina support, wt. percent | Composition of dried, hydrogen halide-free effluent, mole percent | | | | |
|---|---|---|---|---|---|
|  | $CH_3CF_2Cl$ | $CH_2=CF_2$ | $CH_3CF_3$ | $CH_2=CFCl$ | $CH_2=CCl_2$ |
| Ni, 5 [1] | 80 | 10 | 3 | 8 | 0 |
| Ni, 5 [2] | 54 | 38 | 3 | 5 | 0 |
| Zn, 5 [3] | 52 | 38 | 3 | 8 | 0 |
| Zn, 2.7 [4] | 52 | 33 | 9 | 6 | 0 |
| Co, 9.0; Mo, 18.5 | 33 | 61 | 2 | 5 | 0 |

[1] Impregnation of alpha-alumina was carried out with an aqueous solution containing 88.0 g. of $NiCl_2 \cdot 6H_2O$ per 100 ml. of solution.
[2] Impregnation of alpha-alumina was carried out with an aqueous solution containing 108 g. of $Ni(NO_3)_2 \cdot 6H_2O$ per 100 ml. of solution.
[3] Impregnation of alpha-alumina was carried out with an aqueous solution containing 45.3 g. of $ZnCl_2$ per 100 ml. of solution.
[4] Impregnation of alpha-alumina was carried out with a 40 weight percent aqueous solution of $Zn(BF_4)_2$.

Thus, the use of each of the promoted catalysts resulted in the formation of 1,1-difluoroethylene as the principal reaction product.

Example III

The catalysts used in Example II were employed in another group of runs designed to produce 1,1-difluoroethylene from 1,1-difluoro-1-chloroethane in the same procedure and under the same conditions used in Example II except that the catalyst temperature was maintained at 900° F. Also investigated under these conditions was a rhodium-promoted catalyst prepared by impregnation of alpha-alumina with an aqueous solution of rhodium chloride, with subsequent draining, drying, and heating of the catalyst by the procedure used for the other impregnated catalysts. Additionally, alpha-alumina without a promoter and fluorided gamma-alumina were investigated as dehydrochlorinating agents under the same conditions. The results of these experiments are summarized in Table III, the mole percent of each component in the dried, hydrogen halide-free effluent being rounded off to the nearest whole number.

TABLE III

| Metal promoter on alumina support, wt. percent | Composition of dried, hydrogen halide-free effluent, mole percent | | | | |
|---|---|---|---|---|---|
| | $CH_3CF_2Cl$ | $CH_2=CF_2$ | $CH_3CF_3$ | $CH_2=CFCl$ | $CH_2=CCl_2$ |
| Ni, 5 [1] | 25 | 63 | 3 | 9 | 0 |
| Ni, 5 [2] | 14 | 76 | 3 | 7 | 0 |
| Zn, 5 [3] | 4 | 82 | 2 | 12 | 0 |
| Zn, 2.7 [4] | 13 | 74 | 5 | 9 | 0 |
| Rh, 0.2 [5] | 8 | 76 | 4 | 13 | 0 |
| Co, 9.0; Mo, 18.5 [6] | 2 | 71 | 11 | 16 | 0 |
| Alpha-alumina only | 46 | 45 | 2 | 7 | 0 |
| Fluorided gamma-alumina [7] | 1 | 17 | 40 | 30 | 12 |

[1] See footnote 1 to Table II.
[2] See footnote 2 to Table II.
[3] See footnote 3 to Table II.
[4] See footnote 4 to Table II.
[5] Impregnation of alpha-alumina was carried out with an aqueous solution containing 1.27 g. of $RhCl_3$ per 100 ml. of solution.
[6] Girder T-305 catalyst comprising cobalt- and molybdenum-promoted alumina; surface area, 26 square meters per gram.
[7] See footnote 3 to Table I. No alpha-alumina support was used.

As in Example I, the alpha-alumina employed in Examples II and III had a surface area of less than 1 square meter per gram.

Thus, the use of alpha-alumina, with or without a metal promotor, resulted in the conversion of 1,1-difluoro-1-chloroethane at 900° F. to give 1,1-difluoroethylene as the principal reaction product. In contrast, 1,1-difluoroethylene was a minor product when fluorided gamma-alumina was used as the catalyst.

When 1,1-difluoro-1-chloroethane was passed at atmospheric pressure through the same tubular reactor, in the absence of a catalyst, at 900° F. at a flow rate of 100 volumes per volume of reactor per hour, 93 mole percent of the 1,1-difluoro-1-chloroethane remained unconverted.

Reasonable variation and modification are possible within the scope of the foregoing disclosure, and the appended claims to the invention, the essence of which is that a gem-difluoroalkene is produced by contacting a 1,1-difluoro-1-haloalkane with low surface area alumina under dehydrohalogenation conditions.

I claim:

1. A process for producing a gem-difluoro-alkene comprising contacting a 1,1-difluoro-1-haloalkane of the formula $R_2CHCF_2X$, wherein X is selected from chlorine and bromine, R is selected from hydrogen and alkyl radicals having 1 to 8 carbon atoms, and the total number of carbon atoms in the alkane does not exceed 10, with low surface area alumina having a low surface area of less than about 50 m.$^2$/gram at a temperature between 300° F. and 1200° F.

2. Process of claim 1 wherein said contacting occurs at a temperature between 600° F. and 1000° F.

3. Process of claim 1 wherein said 1,1-difluoro-1-haloalkane is in the vapor phase during said contacting.

4. Process of claim 1 wherein said 1,1-difluoro-1-haloalkane is in the vapor phase during said contacting and is diluted with an inert gas.

5. Process of claim 1 wherein said catalyst contains a promoter selected from zinc, chromium, cobalt, silver, copper, vanadium, iron, molybdenum, nickel, lead, antimony, tin, ruthenium, rhodium, palladium, osmium, iridium, platinum, and compounds thereof.

6. Process of claim 1 wherein said alumina comprises essentially alpha-alumina.

7. Process of claim 1 wherein said 1,1-difluoro-1-haloalkane is 1,1-difluoro-1-chloroethane.

8. Process of claim 1 wherein said 1,1-difluoro-1-haloalkane is 1,1-difluoro-1-chloroethane and said catalyst contains a promoter selected from salts of nickel, zinc, cobalt, molybdenum and rhodium.

9. The process of claim 1 wherein said alumina has a surface area of less than about 1 m.$^2$/gram.

References Cited

UNITED STATES PATENTS 2,478,933  8/1949  Bratton et al. _____ 260—653.5
3,118,005  1/1964  Pavlath et al. _____ 260—653.5

DANIEL D. HORWITZ, *Primary Examiner.*

U.S. Cl. X.R.

252—461, 463, 464, 465, 466